United States Patent [19]

Haley, Sr.

[11] Patent Number: 4,793,628

[45] Date of Patent: Dec. 27, 1988

[54] TRANSPORTABLE AND COLLAPSABLE BAG CARRYING CART

[76] Inventor: Thomas S. Haley, Sr., 14 Hemlock Ct., Cromwell, Conn. 06416

[21] Appl. No.: 128,607

[22] Filed: Dec. 4, 1987

Related U.S. Application Data

[63] Continuation-in-part of Ser. No. 933,817, Nov. 24, 1986, abandoned.

[51] Int. Cl.⁴ .............................................. B62B 3/02
[52] U.S. Cl. .................................. 280/641; 280/651; 248/98; 248/99
[58] Field of Search ............... 280/639, 641, 649, 651, 280/39, 42; 248/95, 97, 98, 99, 100; 220/403, 404; 108/135

[56] References Cited

U.S. PATENT DOCUMENTS

| | | | |
|---|---|---|---|
| 2,042,517 | 6/1936 | Ellis | 108/135 |
| 2,429,034 | 10/1947 | Smith et al. | 280/641 |
| 2,992,833 | 7/1961 | Hoedinghaus et al. | 280/641 |
| 4,549,748 | 10/1985 | Haley, Sr. | 280/641 |
| 4,593,873 | 6/1986 | Nelson | 248/98 |
| 4,611,823 | 9/1986 | Haus | 280/651 |

Primary Examiner—John J. Love
Assistant Examiner—Richard Camby
Attorney, Agent, or Firm—Fishman, Dionne & Cantor

[57] ABSTRACT

A bag holding cart for use in collecting and conveying materials in a hospital, hotel, or other institution comprising a pair of inverted U-shaped frame support members pivotably connected at about their respective centers is presented. A unitary base is provided to the lower portion of the cart. This base is pivotably connected to one of the frame members and is detachably connected to the other frame member preferably via a spring clip mechanism which affords a snap lock between the frame member and the base. This unitary base and associated snap lock mechanism is an important feature of the present invention as it permits the cart to be folded in a very compact fashion for improved storage and transport. Another important feature of the present invention is a foot pedal actuated cover or lid. This cover is pivotably attached to the upper portion of the cart and may be actuated by a foot pedal which is linked to the cover by a pair of wire supports.

33 Claims, 4 Drawing Sheets

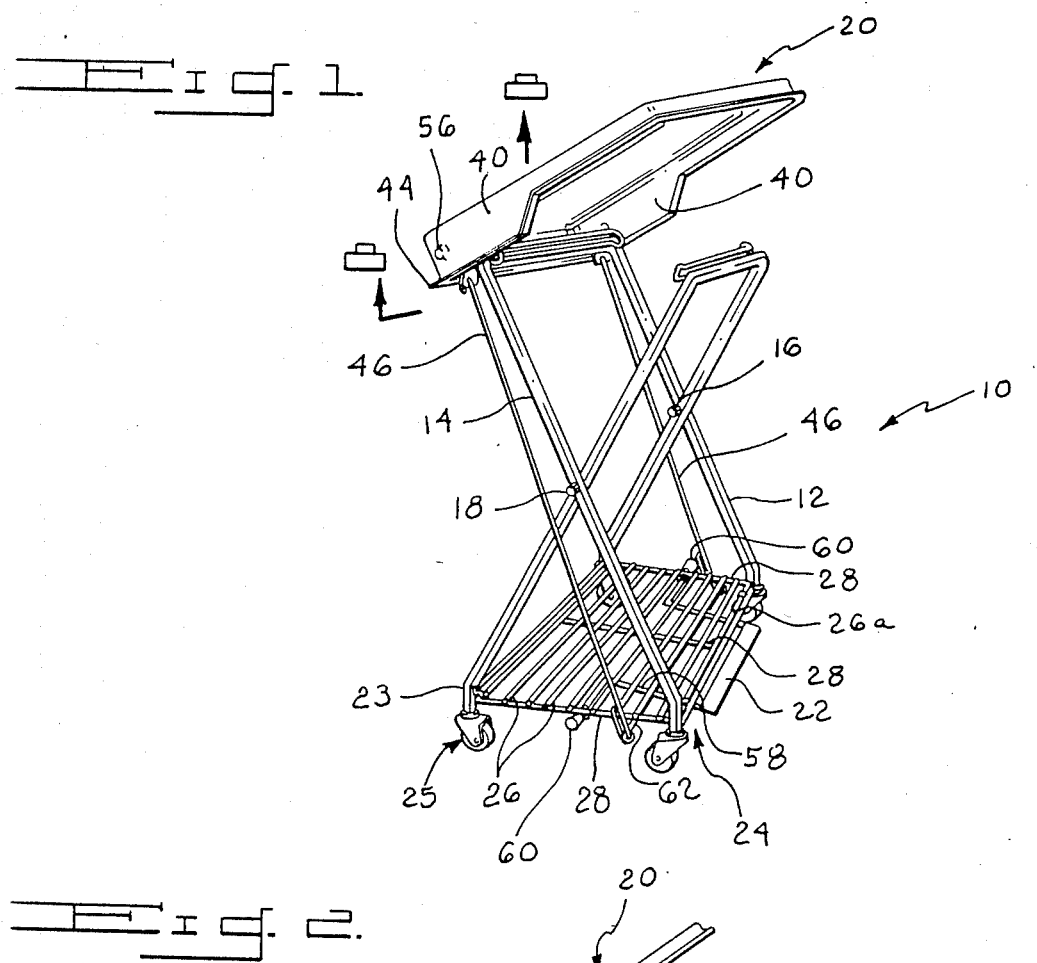
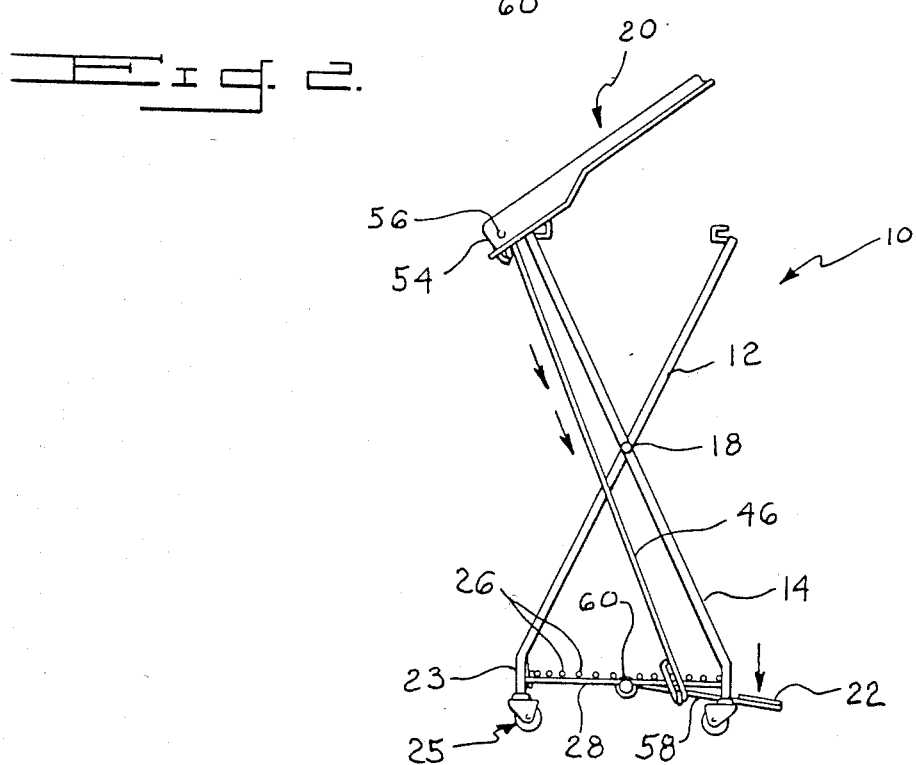

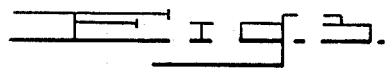
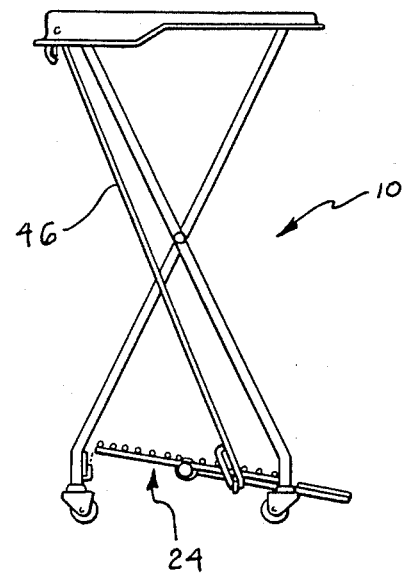
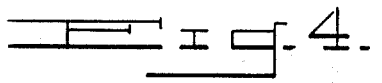
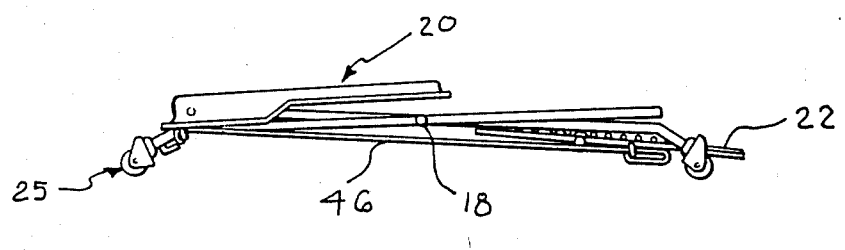

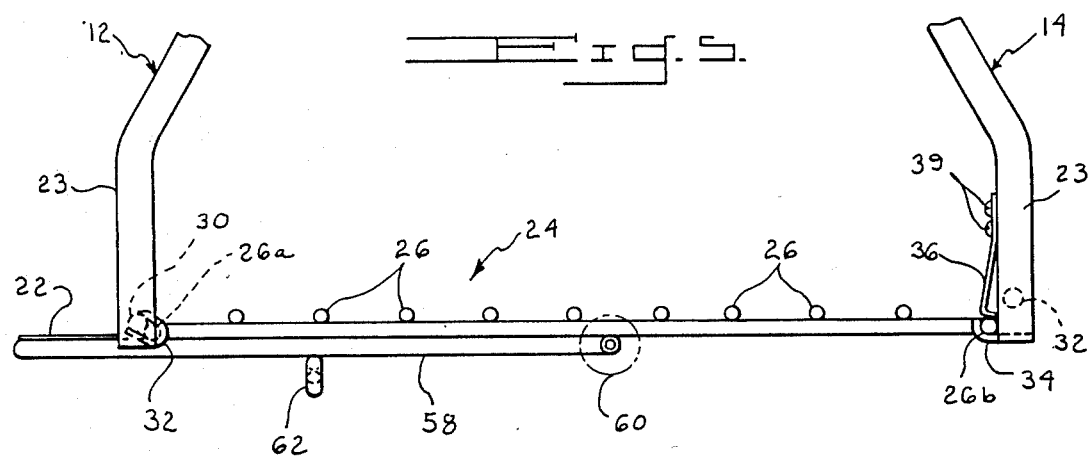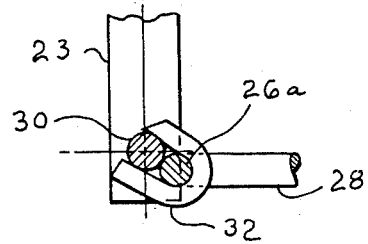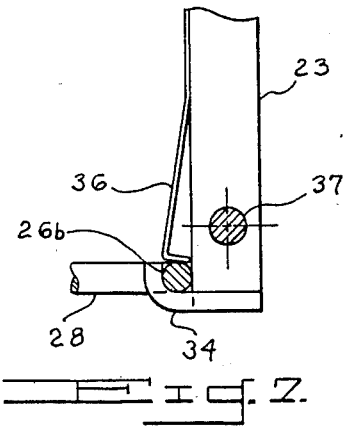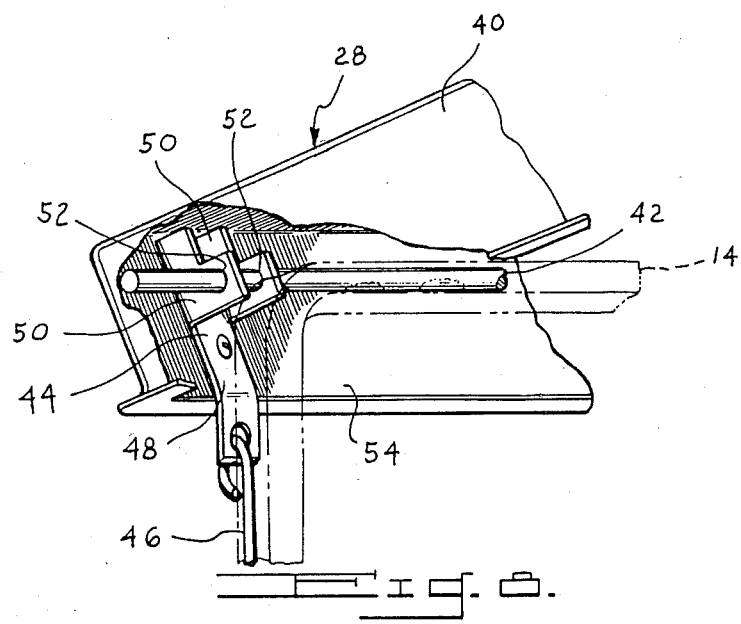

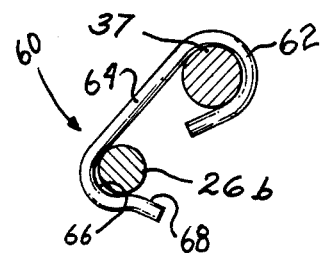
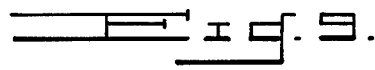

TRANSPORTABLE AND COLLAPSABLE BAG CARRYING CART

BACKGROUND OF THE INVENTION

This invention relates to a transportable bag holding device for use in collecting and conveying materials such as bedding, laundry or trash in hotels, hospitals or the like. More particularly, this invention relates to a new and improved bag carrying cart which is similar to the cart disclosed in my earlier U.S. Pat. No. 4,549,748, but which includes several improved features including, for example, improved folding ability and foot actuated lifting means associated with the cart's cover.

My earlier U.S. Pat. No. 4,549,748, which is incorporated herein in its entirety, related to a novel bag holding device for use in collecting and conveying materials such as bedding, laundry or trash in a hospital, hotel or other institution. The bag holding cart of U.S. Pat. No. 4,549,748 is comprised, in part, of a pair of inverted U-shaped frame support members pivotally connected at about their respective centers. A foldable base is provided to the lower portion of the cart, the base preferably having a locking means attached thereto. The cart is movable along conventional wheels or casters for easy transport. The upper portion of each inverted U-shaped support member is provided with novel bag retention safety bars which help to preclude bags, especially plastic bags, from sliding off the frame after material has been deposited therein. Finally, a hand actuated cover or lid assembly effects adequate closure while permitting ease of opening.

While well suited for its intended purposes, the bag holding cart of U.S. Pat. No. 4,549,748 suffers from several perceived deficiencies and disadvantages. For example, while the cart is foldable (see FIG. 4 of U.S. Pat. 4,549,748) for ease of storage and shipping, even in its folded state, the cart is rather bulky and cumbersome. Also, the slidable cover of my earlier cart must be opened and closed by hand. Unfortunately, such hand operation can be problematic, especially if the cart operator is loaded down with laundry, rubbish, etc. In that case, the operator must first put the load down, then open the cover, and finally pick up the load again and deposit it into a bag supported on the cart. Accordingly, the hand actuated cover leads to labor inefficiency during cart use.

SUMMARY OF THE INVENTION

The above-discussed and other problems and deficiencies of the prior art are overcome or alleviated by the improved device for use in collecting and conveying materials in a hospital, hotel, or other institution of the present invention. In accordance with the present invention, a bag holding cart of the type disclosed in U.S. Pat. No. 4,549,748 includes a pair of inverted U-shaped frame support members pivotally connected at about their respective centers. A unitary base is provided to the lower portion of the cart. This base is pivotably connected to one of the frame members and is detachably connected to the other frame member preferably via a spring clip mechanism which affords a snap lock between the frame member and the base. This unitary base and associated snap lock mechanism is an important feature of the present invention as it permits the cart to be folded in a very compact fashion for improved storage and transport.

Another important feature of the present invention is a foot pedal actuated cover or lid. This cover is pivotably attached to the upper portion of the cart and may be actuated by a foot pedal which is linked to the cover by a pair of wire supports. The foot actuated cover permits the lid to be opened without the use of the operator's hands. This is especially advantageous in those situations wherein the operator's arms are loaded down. In that case, the operator simply opens the lid by foot pressure and conveniently deposits the material into the bag supported on the cart.

Much of the remaining structural features of the present invention are substantially similar to those features described in the afornention U.S. Pat. 4,549,748.

The above-described and other features and advantages of the present invention will be appreciated and understood by those skilled in the art from the following detailed description and drawing.

BRIEF DESCRIPTION OF THE DRAWINGS

Referring now to the drawings, wherein like elements are numbered alike in the several FIGURES:

FIG. 1 is a perspective view of a cart in accordance with the present invention without a bag being inserted therein;

FIG. 2 is a side elevation view of the cart of FIG. 1;

FIG. 3 is a side elevation view, similar to FIG. 2, during the folding operation; FIG. 4 is a side elevation view of the cart of FIG. 1 subsequent to being folded;

FIG. 5 is an enlarged side elevation view of the lower portion of the cart of FIG. 1; FIG. 6 is an enlarged sectional view of a first portion of FIG. 5; and FIG. 7 is an enlarged sectional view of a second portion of FIG. 5; FIG. 8 is an enlarged view along the line 8—8 of FIG. 1; and FIG. 9 is a cross-sectional elevation view of a safety bracket for use in securing and locking the cart base to the cart frame.

DESCRIPTION OF THE PREFERRED EMBODIMENT

Referring first to FIGS. 1 and 2, a bag holding transportable cart in accordance with the present invention is shown generally at 10. Cart 10 is comprised of a pair of inverted U-shaped frame support members 12 and 14 pivotally connected about two corresponding bearings 16 and 18. This pivotal connection is preferably along the center of each vertical leg of U-shaped members 12 and 14. As will be discussed in greater detail hereinafter, cart 10 also includes a pivotable cover assembly 20 which is capable of opening and closing under the action of a foot pedal 22; and a base or rack 24 which interconnects the lower portion of frame members 12 and 14. Each U-shaped member 12 and 14 has a vertical straight section 23 which supports a conventional castor or roller 25.

Base or rack 24 is preferably unitary or one piece and provides support for the bags (not shown) after material (i.e., laundry, rubbish, etc.) has been added therein. Base 24 is preferably comprise of a plurality of perpendicular rods including longitudinal rods 26 and latitudinal rods 28. Base 24 is pivotally connected to the front of frame members 12 and 14 in a manner which allows it to be pivoted and folded upwardly or downwardly. One preferred manner of achieving this pivotal connection is shown in FIGS. 5 and 6. Referring to FIGS. 5 and 6, in one embodiment, base 24 (actually longitudinal rod 26a) is pivotably attached to a cross-bar 30 interconnecting frame supports 12 and 14 via a small U-bend 32 to form a swingable hinge assembly. Cross-bar 30 may be welded or otherwise secured between members 12 and 14; while U-bend 32 will be welded or otherwise secured to cross-bar 30. It will be appreciated that longitudinal rod 26a of base 24 will swing or pivot within U-bend 32.

The opposite end of base 24 is detachably connected to the opposing ends of support members 12 and 14. Referring to FIGS. 5 and 7, an L-bend or similar retaining means 34 is provided on straight portions 23 for receiving longitudinal rod 26b of unitary base 24. Rod 26b is retained within L-bend 34 by any suitable means such as snap-lock action performed by spring-clips 36. Spring clips 36 are preferably made from a suitable spring steel and can be pushed inwardly away from rod 26b to permit removal of rod 26b from within L-bend 34. Spring clips 36 may be attached to straight portions 23 by any suitable means such as, for example, fastening means 39. A second cross bar 37 is also provided between members 12 and 14 to rigidize and support the assembled frame.

While well suited for its intended purposes, it has been found that the detachable connection between spring clips 36 of support members 12, 14 and rod 26b of base 24 may become disengaged at undesired times (e.g. during use). As a result, the cart will fold up to the position shown in FIG. 4. It is believed that such disengagement is due to incomplete snap locking of clips 36 by the cart assembler during assembly. In an effort to prevent the cart unit from folding, in a preferred embodiment, a safety device is used to preclude undesired disengagement between base 24 and frame support members 12 and 14.

Referring to FIG. 9, such a safety device is identified generally at 60. Safety device 60 comprises a preferably metal bracket or clip which is preferably permanently pivotably attached to either cross bar 37 or rod 26b. In the FIG. 9 embodiment, section 62 of clip 60 is bent about cross bar 37 to effect permanent attachment thereto. Clip 60 extends from its permanent pivotable attachment 62 to bar 37 a short linear distance 64 to a C-shaped arcuate portion 66 and finally terminates at a ramped section 68 which diverges from C-shaped portion 66.

During use, clip 60 swings freely from cross bar 37. Subsequent to rod 26b being secured in L-bends 24 by spring-clips 36, clip 60 is swung about bar 37 so that ramp 68 contacts rod 26b. Next, force is applied so that ramp 68 advances along rod 26b whereupon ramp 68 and acruate section 66 of clip 60 flex slightly outwardly allowing rod 26b to be fully seated within C-shaped arcuate portion 66. It will be appreciated that the reverse process is followed to disengage clip 60 from rod 26b.

Safety clip 60 is an important feature of the present invention and overcomes the above-discussed problems associated with accidental and premature disengagement of base 24 from frame support members 12 and 14.

Turning now to FIGS. 1, 2, 5 and 8, a discussion of the foot operated cover assembly follows. The cover assembly includes lid 20 having depending side portions 40, a rigid shaft 42 attached between side portions 40, a pair of clips 44 which slip onto shaft 42, wire support rods 46 attached to clips 44 and foot pedal 22 pivotably connected to rods 46. Shaft 42 is welded or otherwise permanently attached to the cross-piece of U-frame 14. Each Clip 44 preferably have a flat base 48 with a pair of parallel sides 50 extending transverse to base 48.

Aligned openings 52 are provided in each extending side 50 with shaft 42 being received in openings 52. Openings 50 are sized to permit shaft 42 to freely pivot therewithin. Clip 44 is attached to the back depending surface 54 of lid 20. Lid 20 also includes oppositely disposed protrusions 56 which receive either end of shaft 42 and act to both align and retain shaft 42 in position. Protrusion 56 also act as a bearing surface between lid 20 and shaft 42.

Foot pedal 22 has a pair of lateral L-shaped extensions 58 which pivotably attach to base 24 at bearing mount 60. Bearing mount 60 is preferably welded onto latitudinal rods 28 and comprise a cylindrical housing which receives the ends of L-shaped extensions 58 therein. The ends of support rods 46 are looped and are connected to corresponding looped ends of a transverse rod 62 (see FIG. 1) which interconnects both support rods 46 and is welded or otherwise secured to L-shaped extensions 58. Thus, when foot pedal 22 is forced downwardly, extensions 58 will also pivot downwardly (via bearing mount 60) bearing against transverse rod 62. As transverse rod 62 is urged downwardly by extensions 58, support rods 46 will be pulled in the direction illustrated by the arrows in FIG. 2 urging clips 44 in the same direction and causing lid 20 to pivot about shaft 42 so as to and be urged open as shown in FIGS. 1 and 2. Upon release of the foot pedal, the reverse takes place with the lid pivoting closed.

As mentioned, an important feature of the present invention is its ability to close into a compact form. Referring first to FIG. 3, during the closure or folding operation, base 24 is initially disengaged from both L-bends 34 by urging the spring clips 36 toward supports 12 and 14 and lifting base 24 upwardly. At this point, base 24 will swing about the hinge described in conjunction with FIG. 6 and cart 10 will fold into the compact shape shown in FIG. 4 with frame support members 12 and 14 pivoting about bearings 16 and 18 and the cover dropping forward and down as it pivots about pivoting shaft 42. The significance of the looped ends of support rods 46 is apparent in FIG. 4. Thus, during closure, rods 46 will be urged forward with the elongated looped ends providing the necessary "float"0 to preclude rods 46 from bending (compare FIGS. 3 and 4).

It will be appreciated that the important bag holding described in U. S. Pat. No 4,549,748. Thus, referring now to FIGS. 1-3 of my prior U.S. Pat. No. 4,549,748, each of the two cross-piece segments of U-shaped members 12 and 14 are provided with a pair of bag retention safety bars identified at 38 and 40. These bars 38, 40 are preferably welded onto U-shaped frames 12 and 14, respectively. Safety bars 38 and 40 are preferably comprised of two parallel straight portions 42 and 44 interconnected at each end by a U-shaped retaining member 46. As shown in FIG. 3 of the U.S. Pat. No. 4,549,748, when either a plastic or cloth bag 48 is mounted on the cart 10, the bag should be mounted so as to overlap and fit tightly about the two safety bars 38 and 40. If a heavy load is added to the bag 48 and the bag is plastic, the bag will be urged downwardly (and the overlap urged upwardly). In accordance with the present invention if the bag slides as suggested, the outer edges thereof will slip into the notches provided by the two safety bars 38 and 40 and be securely loaded therein. As a consequence thereof, plastic bags 48 will be prevented from prematurely slipping out of the cart 10. It will be appreciated that the bags should not be lifted upwardly out of the cart during changing, but instead should be removed from the front of the cart frame. Also, in a preferred embodiment, strips 60, 62 of the Velcro-type self-adhesive material are applied to at least one of the crosspiece segments of U-shape members 12 and 14. Similarly, corresponding strips of Velcro-type fasteners are attached onto fabric (i.e., cloth, canvas, etc.) bags. Thus, when the fabric bags are mounted onto the cart as shown in FIG. 3, the Velcro-type fasteners will securely fix the heavier (relative to light weight plastic) fabric bags to the cart frame.

Similarly, cart 10 of the present invention may also be used with the various basket assemblies and interlocking correcting devices described in FIGS. 5-8 of U. S. Pat. No. 4,599,478, the disclosures of which have been fully incorporated herein.

The novel bag holding cart of the present invention thus maintains many important features of the earlier cart of U.S. Pat. No. 4,599,748, while improving on its disadvantages. The use of a unitary base which detachably connects to the frame permits folding of the unit into a self-contained space saving flat position (FIG. 4) for improved storage and lower shipping costs. The foot operated cover assembly precludes the use of hands, thereby permitting operation of the cart when both arms of the operator are loaded with material to be added into the bag.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A foldable bag holding cart comprising:
   first and second frame means, said first frame means pivotally connected to said second frame means, each of said first and second frame means having an inverted U-shape, said U-shape including two substantially vertical legs having a cross-piece member therebetween;
   unitary base means pivotally attached to a first leg of each of said first and second frame means, said base means being composed of a rack having longitudinal rods and latitudinal rods transverse to said longitudinal rods;
   said base means being detachably connected to a second leg of each of said first and second frame means;
   cover assembly means, said cover assembly means being pivotable on said frame means;
   wherein said first and second frame means is foldable when said base means is detached from said second legs of said first and second frame means;
   rod supporting means extending from said second legs of said first and second frame means;
   one of said longitudinal rods from said rack being received within said rod supporting means;
   means for temporarily retaining said longitudinal rod with said rod supporting means wherein said base means is detachably connected to said second first and second frame means, said temporary retaining means comprising a spring clip attached to said second legs of said first and second frame means and being normally disposed over said longitudinal rod received within said rod supporting means.

2. The cart of claim 1 including:
   a cross member between said first legs of said first and second frame means;
   at least one U-shaped retainer attached to said cross member; and
   one of said longitudinal rods from said rack being freely received within said U-shaped retainer to define a hinge between said rack and said first and second frame means wherein said rack base means is pivotally attached to said first and second frame means.

3. The cart of claim 1 wherein:
   said rod supporting means is L-shaped.

4. The cart of claim 1 wherein said cover assembly means comprises:
   a lid pivotably attached to one of said first or second frame means;
   foot pedal means pivotably attached to said unitary base means; and
   rod extensions connected between said foot pedal means and said lid whereby said rod extensions urge said lid to pivot into an open position when said foot pedal means is pivoted downwardly.

5. The cart of claim 4 wherein:
   said lid includes depending side and back portions and further including;
   a rigid shaft attached to one of said first or second frame means;
   clip means attached to said back portion of said lid, said clip means including openings therethrough for freely receiving said rigid shaft, said rod extensions being connected to said clip means wherein said clip means pivot about said rigid shaft when said rod extensions are actuated by said foot pedal.

6. The cart of claim 5 including:
   a pair of oppositely disposed protrusions in said depending side portions of said lid and wherein said rigid rod is received within said protrusions.

7. The cart of claim 4 wherein:
   each of said rod extensions include elongated loops connected to said foot pedal means.

8. The cart of claim 1 including:
   roller means connected to said first and second frame means whereby said cart is transportable.

9. The cart of claim 1 including:
   first and second bag retension bar means, said bar means being attached to said cross-piece members, each of said retension bar means including two parallel straight portions interconnected at each end by U-shape retaining members.

10. The cart of claim 8 wherein said roller means comprises casters.

11. The cart of claim 1 wherein at least one of said cross-piece members includes:
    at least one strip of Velcro-type fastener, said strip capable of mating with a corresponding strip of Velcro-type fastener on a bag.

12. The cart of claim 1 including:
    connecting means whereby two or more carts may be interconnected.

13. The cart of claim 1 including:
    basket attachment means.

14. The cart of claim 1 including:
    a cross bar between said second legs of said first and second frame means;
    safety clip means having a first end and a second end, said first end being pivotably attached to either said cross bar or one of said longitudinal rods from said rack, said second end of said safety clip means including securing means for effecting secure locking to either said cross bar or one of said longitudinal rods from said rack.

15. The cart of claim 14 wherein said securing means comprises:
said second end of said safety clip means having an arcuate portion which terminates at a diverging ramp.

16. The cart of claim 14 wherein:
said safety clip means has a linear portion between said first and second ends.

17. A foldable bag holding cart comprising:
first and second frame means, said first frame means pivotally connected to said second frame means, each of said first and second frame means having an inverted U-shape, said U-shape including two substantially vertical legs having a cross-piece member therebetween;
unitary base means pivotally attached to a first leg of each of said first and second frame means;
said base means being detachably connected to a second leg of each of said first and second frame means;
cover assembly means, said cover assembly means being pivotable on said frame means;
wherein said first and second frame means is foldable when said base means is detached from said second legs of said first and second frame means;
wherein said cover assembly means comprises;
a lid pivotably attached to one of said first or second frame means, said lid including depending side and back portions;
foot pedal means pivotably attached to said unitary base means;
rod extensions connected between said foot pedal means and said lid whereby said rod extensions urge said lid to pivot into an open position when said foot pedal means is pivoted downwardly;
a rigid shaft attached to one of said first or second frame means,
clip means attached to said back portion of said lid, said clip means including openings therethrough for freely receiving said rigid shaft, said rod extensions being connected to said clip means wherein said clip means pivot about said rigid shaft when said rod extensions are actuated by said foot pedal.

18. The cart of claim 17 including:
a pair of oppositely disposed protrusions in said depending side portions of said lid and wherein said rigid rod is received within said protrusions.

19. A foldable bag holding cart comprising:
first and second frame means, said first frame means pivotally connected to said second frame means, each of said first and second frame means having an inverted U-shape, said U-shape including two substantially vertical legs having a cross-piece member therebetween;
unitary base means pivotally attached to a first leg of each of said first and second frame means;
said base means being detachably connected to a second leg of each of said first and second frame means;
cover assembly means, said cover assembly means being pivotable on said frame means;
wherein said first and second frame means is foldable when said base means is detached from said second legs of said first and second frame means;
wherein said cover assembly means comprises;
a lid pivotably attached to one of said first or second frame means;
foot pedal means pivotably attached to said unitary base means;
rod extensions connected between said foot pedal means and said lid whereby said rod extensions urge said lid to pivot into an open position when said foot pedal means is pivoted downwardly; and
each of said rod extensions including elongated loops connected to said foot pedal means.

20. A foldable bag holding cart comprising:
first and second frame means, said first frame means pivotally connected to said second frame means, each of said first and second frame means having an inverted U-shape, said U-shape including two substantially vertical legs having a cross-piece member therebetween;
base means attached between said legs of each of said first and second frame means;
cover assembly means, said cover assembly means being pivotable on said frame means wherein said cover assembly means comprises;
a lid pivotably attached to one of said first or second frame means, said lid including depending side and back portions;
foot pedal means pivotably attached to said base means;
rod extensions connected between said foot pedal means and said lid whereby said rod extensions urge said lid to pivot into an open position when said foot pedal means is pivoted downwardly;
a rigid shaft attached t one of said first or second frame means; and
clip means attached to said back portion of said lid, said clip means including openings therethrough for freely receiving said rigid shaft, said rod extensions being connected to said clip means wherein said clip means pivot about said rigid shaft when said rod extensions are actuated by said foot pedal.

21. The cart of claim 20 including:
a pair of oppositely disposed protrusions in said depending side portions of said lid and wherein said rigid rod is received within said protrusions.

22. The cart of claim 20 wherein:
each of said rod extensions include elongated loops connected to said foot pedal means.

23. The cart of claim 20 wherein said base means comprises unitary base means and wherein:
said unitary base means is pivotally attached to a first leg of each of said first and second frame means;
said base means being detachably connected to a second leg of each of said first and second frame means;
wherein said first and second frame means is foldable when said base means is detached from said second legs of said first and second frame means.

24. The cart of claim 23 wherein said base means further comprises:
a rack having longitudinal rods and latitudinal rods transverse to said longitudinal rods.

25. The cart of claim 24 including:
a cross member between said first legs of said first and second frame means;
at least one U-shaped retainer attached to said cross member; and
one of said longitudinal rods from said rack being freely received within said U-shaped retainer to define a hinge between said rack and said first and second frame means wherein said rack base means is pivotally attached to said first and second frame means.

26. The cart of claim 24 including:
rod supporting means extending from said second legs of said first and second frame means;
one of said longitudinal rods from said rack being received within said rod supporting means; and
means for temporarily retaining said longitudinal rod with said rod supporting means wherein said base means is detachably connected to said first and second frame means.

27. The cart of claim 26 wherein:
said rod supporting means is L-shaped.

28. The cart of claim 26 wherein:
said temporary retaining means comprises a spring clip attached to said second legs of said first and second frame means and being normally disposed over said longitudinal rod received within said rod supporting means.

29. The cart of claim 20 including:
first and second bag retension bar means, said bar means being attached to said cross-piece members, each of said retension bar means including two parallel straight portions interconnected at each end by U-shape retaining members.

30. A foldable bag holding cart comprising:
first and second frame means, said first frame means pivotally connected to said second frame means, each of said first and second frame means having an inverted U-shape, said U-shape including two substantially vertical legs having a cross-piece member therebetween;
base means attached between said legs of each of said first and second frame means;
cover assembly means, said cover assembly means being pivotable on said frame means wherein said cover assembly means comprises;
a lid pivotably attached to one of said first or second frame means;
foot pedal means pivotably attached to said base means;
rod extensions connected between said foot pedal means and said lid whereby said rod extensions urge said lid to pivot into an open opsition when said foot pedal means is pivoted downwardly, each of said rod extensions including elongated loops connected to said foot pedal means.

31. A foldable bag holding cart comprising:
first and second frame means, said first frame means pivotally connected to said second frame means, each of said first and second frame means having an inverted U-shape, said U-shape including two substantially vertical legs having a cross-piece member therebetween;
unitary base means pivotally attached to a first leg of each of said first and second frame means, said base means being composed of a rack having longitudinal rods and latitudinal rods transverse to said longitudinal rods;
said base means being detachably connected to a second leg of each of said first and second frame means;
cover assembly means, said cover assembly means being pivotable on said frame means;
wherein said first and second frame means is foldable when said base means is detached from said second legs of said first and second frame means;
a cross bar between said second legs of said first and second frame means;
safety clip means having a first end and a second end, said first end being pivotably attached to either said cross bar or one of said longitudinal rods from said rack, said second end of said safety clip means including securing means for effecting secure locking to either said cross bar or one of said longitudinal rods from said rack.

32. The cart of claim 31 wherein said securing means comprises:
said second end of said safety clip means having an arcuate portion which terminates at a diverging ramp.

33. The cart of claim 31 wherein:
said safety clip means has a linear portion between said first and second ends.

* * * * *